UNITED STATES PATENT OFFICE.

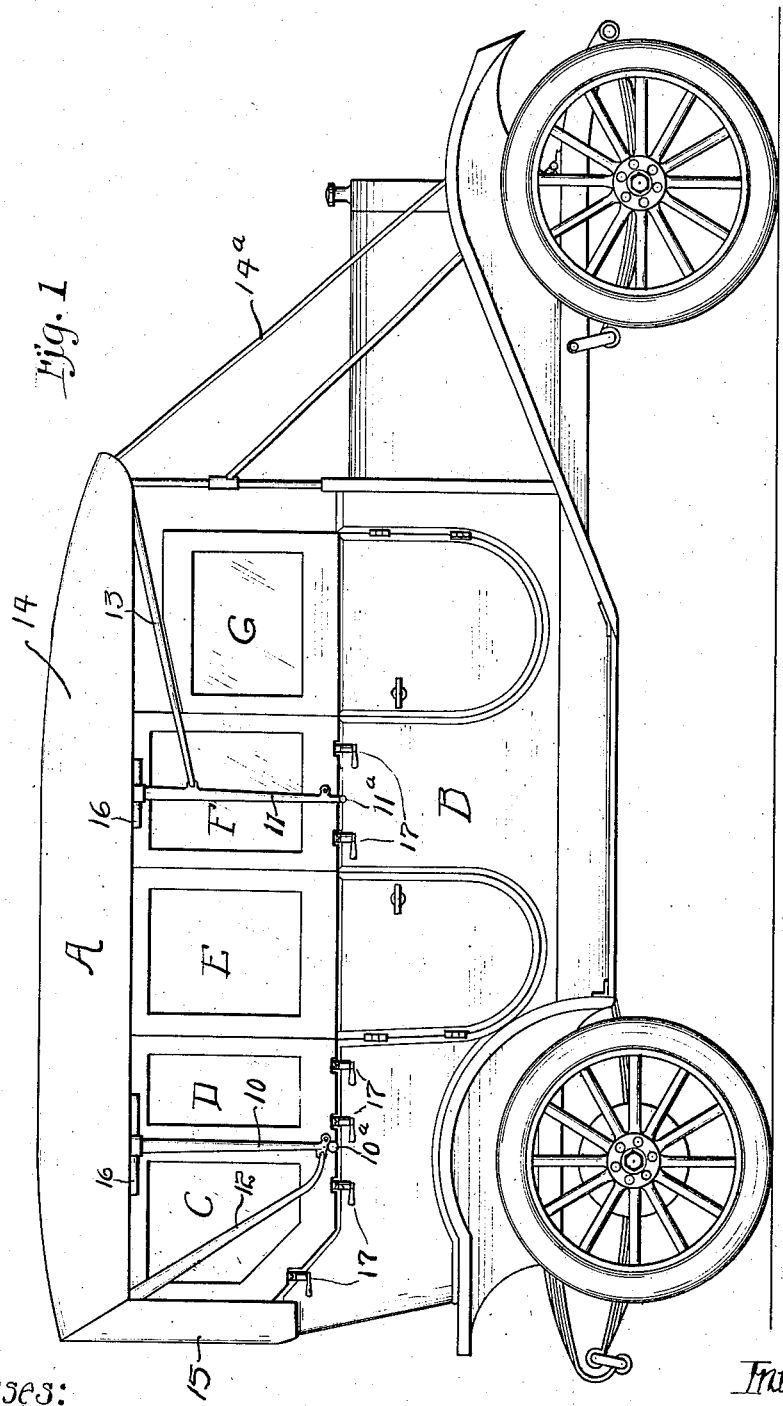

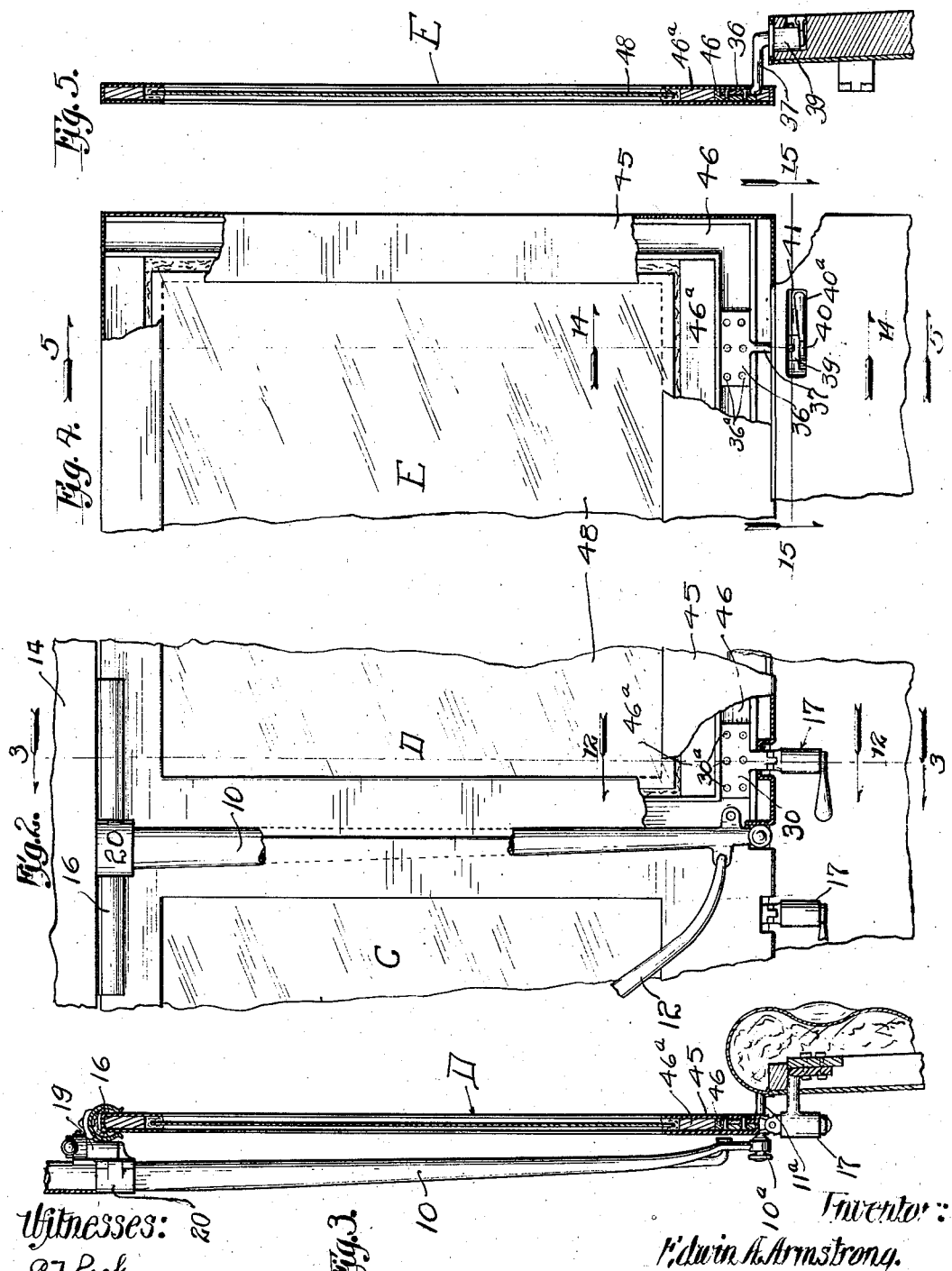

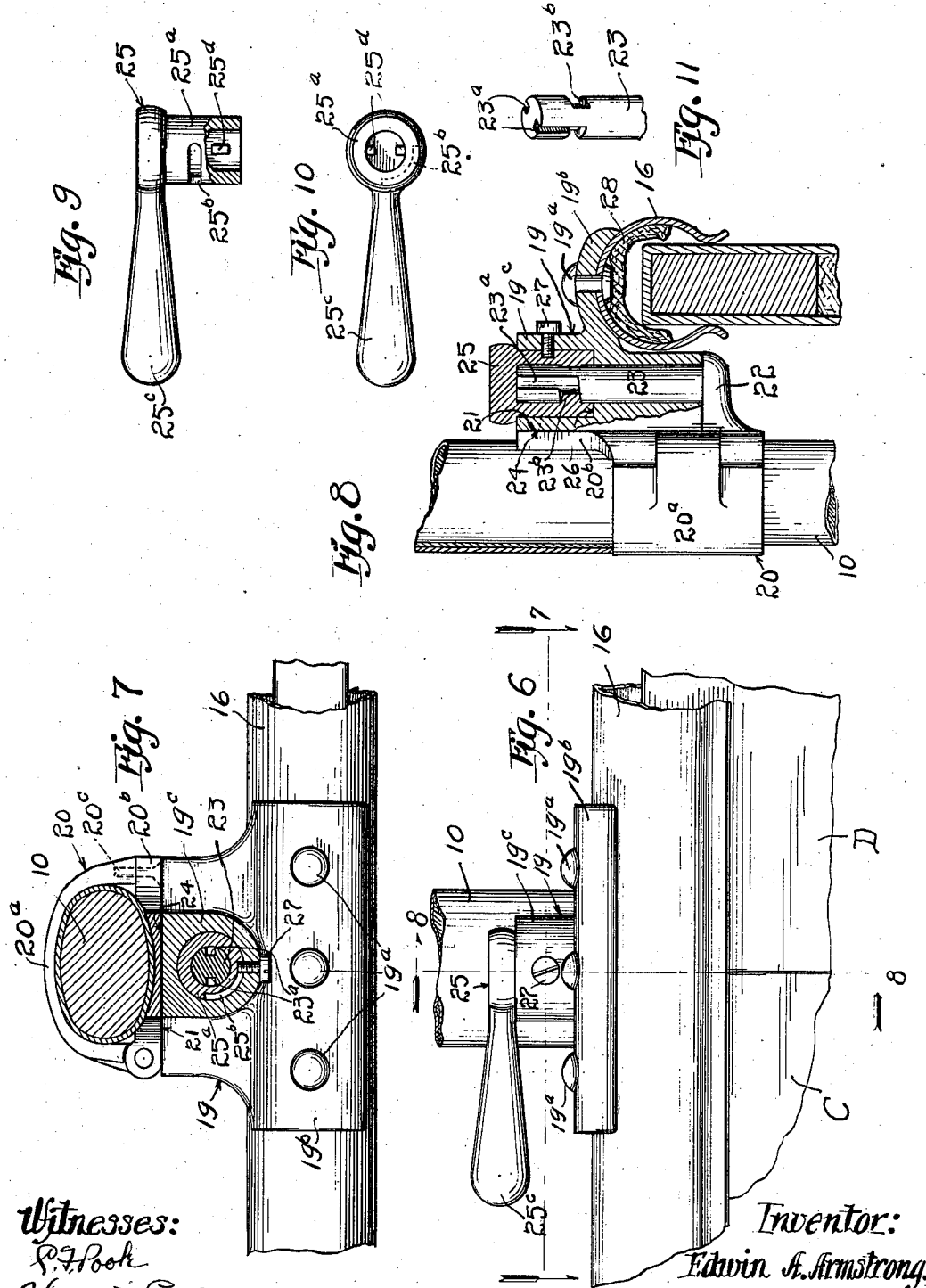

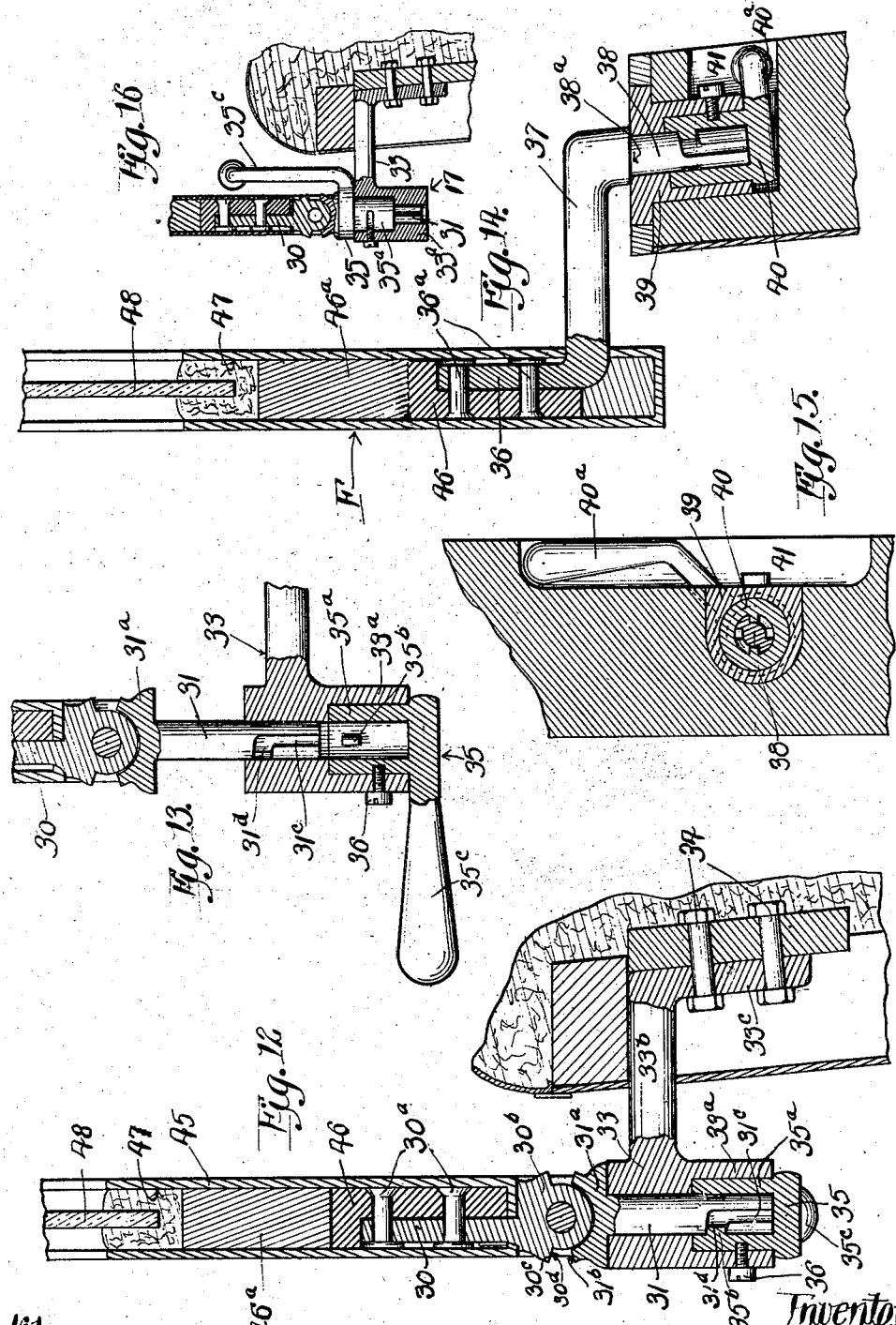

EDWIN A. ARMSTRONG, OF HIGHLAND PARK, ILLINOIS; ZULEIME B. ARMSTRONG EXECUTRIX OF SAID EDWIN A. ARMSTRONG, DECEASED.

REMOVABLE WINDOW FOR VEHICLES.

1,195,638.     Specification of Letters Patent.     Patented Aug. 22, 1916.

Application filed September 20, 1912. Serial No. 721,344.

*To all whom it may concern:*

Be it known that I, EDWIN A. ARMSTRONG, a citizen of the United States, and a resident of Highland Park, in the county of Cook and State of Illinois, have invented certain new and useful Improvements in Removable Windows for Vehicles; and I do hereby declare that the following is a full, clear, and exact description thereof, reference being had to the accompanying drawings, and to the letters of reference marked thereon, which form a part of this specification.

This invention relates to improvements in removable windows or window sashes for vehicles and more particularly to improvements in removable windows or window sashes adapted for use in connection with the ordinary form of foldable cape-top used upon automobiles, motor vehicles and the like.

Automobiles and like vehicles have commonly been provided with foldable cape-tops having side curtains made of opaque, flexible waterproof material. Such side curtains as heretofore used have been found unsatisfactory for the reason, among others, that when in place they shut off substantially all of the light and make the interior of the vehicle very dark and because they are fastened from the outside, which necessitates the operator getting out of the vehicle to apply and remove the curtains. Aside from the inconvenience of their removal and replacement, such curtains are very much in the way of the occupants in getting into and out of the vehicle.

The principal object of the invention is to provide a series of windows or window sashes, adapted for detachable connection with the vehicle body and the doors thereof, and designed to take the place of the side curtains heretofore used, while at the same time forming with the foldable top a substantially complete inclosure for the interior of the vehicle.

A further object of the invention is to provide a construction in means for detachably connecting or securing the sashes to the vehicle, in such manner as to avoid liability of the breakage of the sashes or the glass therein through the vibration or jarring of the vehicle body or lateral movements or swaying of the top; and a further object of the invention is to provide windows or window sashes adapted for detachable connection with the doors of the vehicle, and so arranged that the doors may be swung open or closed without interference with the windows or sashes on the body or with the folding top.

The invention consists in the matters hereinafter described and pointed out in the appended claims.

In the accompanying drawings—Figure 1 is a view in elevation of an ordinary type of motor vehicle with a foldable cape-top, showing the removable window sash embodying my invention; Fig. 2 is an enlarged detail view showing the rear sectional bow of the top and portions of the window sashes adjacent thereto, with parts removed to show the details of construction; Fig. 3 is a cross sectional view taken on line 3—3 of Fig. 2; Fig. 4 is an enlarged detail view of the sash attached to a door of the vehicle, with parts removed to show the construction thereof; Fig. 5 is a cross sectional view taken on line 5—5 of Fig. 4; Fig. 6 is an enlarged detail view, in side elevation, of a portion of the sash-holding rail and clamp; Fig. 7 is a cross sectional view taken on line 7—7 of Fig. 6; Fig. 8 is a cross sectional view taken on line 8—8 of Fig. 6, with parts in elevation; Fig. 9 is a view, in side elevation, of a locking member; Fig. 10 is a bottom plan view of the locking member; Fig. 11 is a view in perspective of the upper extremity of the stem of a locking device, showing the location of the grooves therein; Fig. 12 is a large cross sectional view taken on line 12—12 of Fig. 2; Fig. 13 is a fragmentary view of Fig. 12, showing the locking member in position to receive the stem; Fig. 14 is a large cross sectional view taken on line 14—14 of Fig. 4; Fig. 15 is a cross sectional view taken on line 15—15 of Fig. 4; Fig. 16 is a view showing a modified form of the locking device for securing the window sash to the vehicle body.

Referring to the drawings, I have therein shown a motor vehicle (Fig. 1) of the touring-car type, provided with a folding cape-top A of the usual construction, which extends over and is attached to the body B of the vehicle and embraces vertical U-shaped bows 10 and 11, the lower ends of which are pivotally mounted upon brackets, 10ª and 11ª, which are rigidly secured to the side walls of the vehicle body. The top A also includes a rearwardly inclined bow 12, pivotally connected at its end with the vertical bow 10 at or adjacent the lower end of said bow 10, and a forwardly inclined bow 13, similarly connected with the bow 11 at points midway of the length of the vertical arms thereof. A covering 14, of waterproof fabric, is stretched over said bows, and is provided with a rear wall 15, of the same material. Straps 14ª, extending from the forward end of the top B to a point in the front portion of the vehicle, are adapted to afford additional support for the top. The top is so constructed that the forward bow 11 may be detached from its supporting brackets and engaged with the brackets 10ª, 10ª, and the top folded backward and downward, as heretofore common in the case of like folding tops.

A plurality of windows, C, D, E, F and G, each consisting of a pane of glass and a surrounding sash, are supported in a vertical position along either side of the vehicle and extend substantially the length of the vehicle body. Said windows occupy the space between the upper margins of the side walls and doors of the body, and the lower margin of the covering 14 of the top A, thereby forming with the said top A, a substantially complete inclosure for the interior of the vehicle body.

The windows C, D, E, F and G are in pairs and arranged with the companion windows of each pair at opposite sides of the vehicle, and since both sides of the vehicle body are identical, it is to be understood that a description of one of the windows and members associated therewith, applies also to the like window and associated members located in a similar position upon the opposite side of the vehicle body.

The windows C, D and F are flexibly and removably attached at their lower edges to the upper margins of the side walls of the vehicle body and are flexibly and detachably connected at their upper parts to the bows 10 and 11, in such a manner as to partake of any lateral swinging movements of the top. The windows E and G being immediately above the doors, must of necessity swing outward and inward therewith, and hence are not attached to the top B but have rigid connection with the said doors.

Referring to the windows C and D (Figs. 2 and 3), the same are retained in a vertical position and in abutting relation along their adjacent lateral margins by means of a grooved rail 16 secured to the vertical portion of the bow 10 at a point immediately below the lower margin of the cover 14 of the top. Said grooved rail is preferably made of spring metal and is adapted to flexibly grip the adjacent portions of the upper rails of the windows C and D, so as to afford lateral flexibility in the connection of the window with said rail. The said windows are pivotally and detachably secured at their lower margins to the side wall of the vehicle body by means of a plurality of fastening devices 17 so constructed that the windows are held from vertical movement relatively to the body and also have a limited oscillating movement about an axis parallel with and adjacent to the lower edge of the sash, thereby permitting the upper margin of the window sash to swing or move laterally with the folding top. The grooved rail 16 is also adapted to afford endwise sliding movement of the same upon or along the upper rail of the window sash; such as may occur by reason of forward and backward swinging movement of the top in its bows relatively to the vehicle body, it being understood that, as the windows are held by their fastening devices rigidly on the body, so far as any vertical movement is concerned, the sliding of the grooved rail on the window prevents any undue strain being brought on the window sash in the case of any such backward or forward vibratory movement of the top. The window F is retained in position in the same manner as are the windows C and D, being supported throughout the central portion of its upper edge by a grooved rail 16 secured to the vertical arm of the bow 11. The construction of the said rails and the means of securing them to the bows are identical in every instance, and the same is true of the lower fastening devices 17 of the windows C, D and F, hence a description of one rail and one of the lower fastening devices will suffice for all.

Referring in detail to the grooved rail 16 and associated members (Figs. 7 to 11), said rail has the form of a spring metal shell bent into approximately cylindric form and provided with a downwardly facing, longitudinal opening of a width approximately that of the thickness of the upper rails of the window sash, and having the margins thereof bent outwardly so that the upper edge of the sash may be easily inserted in the groove of the rail. Said rail is rigidly secured at its upper and central portion to a bracket 19, by means of a plurality of rivets 19ª extending through said rail 16, and a curved flange 19ᵇ on the bracket 19. A clamp 20 surrounds the vertical arm of the bow 10 and is rigidly secured thereto by means of a band 20ª conforming to the shape of the said arm, which locks the same against a plate 20ᵇ to which the band is hinged at one end and through which a screw 20ᶜ extends (Fig. 7); said screw having threaded engagement with the said band 20ª. The plate 20ᵇ extends longitudinally of the arm 10 and is provided with an outwardly facing flat surface 21. A lug 22 projects laterally from the plate 20ᵇ, upon which lug is a vertical stem 23, provided at its upper portion with diametrically arranged, longitudinal, locking grooves 23ª, the same being connected at their lower ends with a somewhat wider groove 23ᵇ, extending part-way around the stem 23 and slightly oblique to the axis thereof. Said clamp 20 is adapted to support the bracket 19 and the rail 16 attached thereto; said bracket being provided with a socket member 19ᶜ, having a vertical bore or socket therein, adapted to receive the stem 23. Said socket member 19ᶜ is further provided with an outwardly facing, flat surface 24 adapted to coact with a similar surface 21 on the clamp, thereby insuring the correct seating of the bracket 19 upon the clamp 20. Seated in the socket member 19ᶜ of the bracket 19 and at the upper end thereof is a locking member 25 (Figs. 9 and 10) comprising a hollow shank 25ª adapted to receive the upper end of the stem 23 and to be mounted within a suitable seat 26 in the socket member 19ᶜ of the bracket, and provided with a transverse slot 25ᵇ, adapted to receive the end of a screw 27 extending through the wall of the bracket and acting by its engagement with the groove 25ᵇ to retain the locking member within its seat. The groove 25ᵇ is of such length as to permit rotative movement of the locking member 25 through an angle of about 90 degrees. A handle 25ᶜ is provided on the locking member in order that the latter may be rotated by hand. Upon the inner annular surface of the shank 25ª and near the extremity thereof are two diametrically arranged lugs 25ᵈ, 25ᵈ. Said lugs are so arranged and formed that they will enter and engage the longitudinal grooves 23ª, 23ª and the transverse groove 23ᵇ of the stem 23. A layer of felt 28 is located in the grooves of the rail 16 to afford a cushion between the upper edge of the window sash and the said rail.

The windows are secured to the body of the vehicle by a locking device similar to that described above. A plate 30 (Figs. 2, 3 and 12) is rigidly secured to the lower rail of the window sash by means of a plurality of rivets 30ª. Extending downwardly from the central portion of the said plate is a lug 30ᵇ provided with ears 30ᶜ having downwardly facing shoulders 30ᵈ. Hinged or pivoted to the said lug is a stem 31 having an annular shoulder 31ª formed at its upper end and upwardly facing shoulders 31ᵇ adapted to coact with the corresponding shoulders 30ᵈ, thereby acting as stops to limit the oscillating movement between the hinged member. The said stem 31 is provided at its lower end with diametrically arranged grooves 31ᶜ and an annular groove 31ᵈ identical with those described above in connection with the stem 23. The stem 31 fits within the central bore of a socket member 33ª upon a supporting bracket 33; the shoulder 31ª of said stem seating on the upper surface of said socket member. The bracket 33 comprises, together with the above-mentioned socket member 33ª, a horizontal arm 33ᵇ provided at its inner end with a flange 33ᶜ, through which extends a suitable number of bolts 34, rigidly securing the bracket to the side wall of the vehicle body. The arm 33ᵇ of said bracket is of such length as to support the socket member thereof approximately in the same vertical plane with the grooved rail 16 (Fig. 3).

A locking member 35, identical with the locking member 23 described above, is rotatably mounted in the socket member 33ª, and is similarly provided with a centrally apertured shank 35ª, adapted to receive the extremity of the stem 31, diametrically arranged lugs 35ᵇ engaging the longitudinal grooves 31ᶜ and annular groove 31ᵈ of the stem 31, and a handle 35ᶜ. Said locking member is also similarly retained in position by means of a groove (not shown) similar to the groove 25ᵇ of the locking member 23 and a screw 36.

The fastening devices used in securing the window sashes E and G to the doors, embody the features of the above described devices in a modified form (Figs. 4 and 5). Each of these devices may be described as follows: A plate 36 (Fig. 14) is secured to the lower rail of the sash and adjacent to the inner face thereof by means of a plurality of rivets 36ª. Integral with said plate is an arm 37 extending at right angles thereto. The inner end of said arm is bent downwardly at right angles and given the form of a stem 38 similar to the stems 23 and 31 described above, and having a shoulder 38ª at its upper extremity. A socket member 39 is rigidly mounted within the upper margin of the door and is provided with a central bore or socket adapted to receive the stem 38. The said bore is of a greater diameter in its lower portion and a locking member 40 is rotatably mounted therein. Said locking member performs the same function as described in connection with the locking members 23 and 35. A recess 41 is provided in the inner wall of the door and is adapted to receive the handle 40ª of the key when the same is in locked position, the said handle being properly bent so that it may lie entirely within the recess.

Referring to Figs. 12 and 13, the method of operating the locking mechanism will be readily understood. Before inserting the stem 31 into the vertical bore of the socket 33ª, the locking member 35 is rotated to a position in which the handle extends outward or parallel to the arm 33ᵇ of the bracket 33, in which position the lugs 35ᵇ may engage the longitudinal grooves 31ᶜ (Fig. 13). The stem is then forced downwardly to its lowermost position (Fig. 12) and the locking member turned backwardly through an angle of 90°, by which movement the lugs 35ᵇ engage the annular groove 31ᵈ, which being slightly oblique to the axis of the stem, the contact of the lugs therewith tends to draw the stem downwardly, holding or clamping the same firmly in locked position.

The structure of the window sashes is preferably a combination of metal and wood, as shown in Figs. 3 and 5. Each sash rail comprises a metallic shell 45 (Fig. 12) strengthened by a bent metal strip 46 inclosed within the metallic shell and extending along the bottom and side rails of the sash. Said strip is channeled upon one side in order to afford the necessary stiffness or strength without undue weight therein, and to provide spaces in which the plates 30 (see Fig. 12) and 36 (see Fig. 14) may be secured with their outer faces flush with the inner surface of the metallic shell. A filling strip 46ᵃ of wood extends along the bottom rail of the sash within its metal shell and above the horizontal member of the metal strip 46. A groove 47 formed between the side margins of the metallic shell, extends about the inner edge of the sash and is adapted to receive the edges of the glass 48; the latter being embedded in a layer of felt or similar material adapted to prevent the rattling of the glass and to otherwise afford a yielding means of retaining the same.

The window sashes C, D and F are easily applied to the vehicle by first securing and locking them in a vertical position at their lower margins, and then raising the grooved rails 16 upwardly upon the stems 23 and inserting the upper edges of the window sashes therein, after which operation the said rails are forced downwardly into holding position and locked or made fast. The sashes E and G are applied to the doors by simply inserting the stems 38 in the sockets 39 and operating the locking devices in the manner described above.

The grooved rails are made detachable from the supporting clamps 20, as otherwise, by reason of their length and position on the bows, they would interfere with the lowering or folding of the top.

The locking devices for connecting the window sashes with the body of the vehicle, arranged and operated as described, while located at the lower ends of the socket members 33ᵃ of said locking devices and outside of the vehicle body, may be operated by a person within the vehicle by first putting into place the rearmost window C and operating the locking devices thereof and then applying the window D next forward thereof, and likewise operating its locking devices before the window E is applied to the rearmost door. The locking devices of the forward window F of the body may be locked from the inside of the vehicle before the windows E and G are applied to the doors. In order, however, to afford greater convenience in operating the locking devices for the lower margins of the windows from the interior of the vehicle, the modified construction shown in Fig. 16 may be used. The construction of the locking device shown in said Fig. 16 is the same as that hereinbefore described and shown in Figs. 12 and 13 except that in this instance the rotative locking member 35 is inserted in the top or upper part of the socket member 33ᵃ and has its handle 35ᶜ extended inwardly toward the body of the vehicle and upwardly to pass over the upper margin of the body.

Referring to the sashes which are attached to or mounted on the vehicle body itself, and which have hinged or flexible connection with the top margin of the body and are so connected with the frame or bows of the folding top that they are sustained in vertical position by their connection with said bows, this construction avoids the liability of injury to, or preserves the integrity of the sash under any swaying or sidewise swinging movement of the folding top relative to the vehicle body. In other words, by reason of the connection of the top margins of the sashes with the bows of the top, in association with the flexible connection of the lower parts of the sashes with the body, said upper margins of the sashes are free to swing or move sidewise with the folding top without bringing any strain upon the sashes such as would tend to twist or distort the same or break the panes of glass therein. Moreover, by reason of the construction described, the upper parts of the sashes are adapted to yield laterally with the folding top in case lateral pressure is brought upon the sashes or the bows of the top, as by an occupant of the vehicle falling or being thrown against one of the sashes.

The employment of the locking or fastening devices acting to secure the window sash to the body of the vehicle in such manner as to hold said sash from vertical movement, together with the device for connecting the upper margin of the sash with the bow of the folding top, adapted to hold the sash from sidewise movement, relatively to the top, while permitting movement of said top relatively to the sash, in a backward and forward direction, has the important advantage of preventing any strain being brought upon the sash through backward and forward movement of the top or bows relatively to the vehicle body and of avoiding liability of injury to or breaking of the sashes through such backward and forward movement of the top.

From the above it will be understood that my invention is designed to avoid injury to the sashes either through lateral or endwise movements of the folding top; the upper margins of the sashes moving with the top in any sidewise movement of the latter while the top may move backward and forward relatively to the sashes without bringing any strains upon the latter of a kind tending to break or injure the same.

So far as the sashes which are secured to the door of the vehicle are concerned, the construction and arrangement thereof described has the advantage of enabling the same to be easily secured to and detached from the doors and to be rigid and strongly held in place upon said doors, while at the same time the doors of the attached sashes may be easily opened and closed without interfering with the other sashes or the folding top.

Other general advantages gained by the construction described are that the window sashes, when removed from their places at the sides of the vehicle, can be carried or stored in a small space provided beneath one of the seats of the vehicle or elsewhere within the same; the sashes and their supporting devices are so arranged and constructed that when the sashes are removed from the sides of the vehicle, the folding top may be folded backward in the usual manner, without interference by reason of the presence of any of said attaching devices; the sashes may be quickly and easily placed in position from the inside of the vehicle, thus making it unnecessary for the operator or any occupant to leave the vehicle in preparing the same for rain or severe weather, and the said attaching devices are of such form that they may be easily and cheaply constructed and the sashes may be put in place or removed in a short time and with the expenditure of a very small amount of labor and trouble.

A further advantage of the construction described is that some or all of the sashes may be retained in position in mild weather, or in cases where a moderate protection from the wind adds to the comfort of the occupants of the vehicle, and, furthermore, the appearance of the sashes made as described, is such that there will be no detriment to the general appearance of the vehicle if some or all of the sashes are permanently left in position thereon.

The stop shoulders 30$^d$ and 31$^b$ serve to hold the stem 31 nearly in line with the plane of the sash and approximately parallel with each other and thereby facilitate the insertion of the two stems at the same time into their socket members.

Owing to the many designs of vehicles and the various modifications in the forms of the attaching devices that may be employed, without departure from my invention, for securing the window sashes of vehicles of different designs, I do not desire that my invention be limited to the particular features and details of construction shown and described herein, except so far as such features and details may be specifically pointed out in the appended claims, as constituting parts of my invention.

I claim as my invention—

1. The combination with a vehicle body and a foldable top or cover, a window sash comprising a rigid frame, means flexibly connecting the lower part of said sash with said vehicle body, adapted to prevent vertical movement of the sash relatively to the vehicle body, while permitting free lateral movement of the upper part of said sash relatively to said vehicle body, and means connecting the upper part of the sash with the foldable top.

2. The combination of a vehicle body and a foldable top or cover, a window sash comprising a rigid frame, means flexibly connecting the lower part of said sash with the vehicle body, adapted to prevent vertical movement of said sash relatively to said vehicle body, while permitting free lateral movement of the upper part of said sash relatively to said vehicle body, and means connecting the upper part of the sash with the foldable top, permitting free endwise movement of the foldable top relatively to said sash.

3. The combination with a vehicle body and a foldable top or cover, a window sash comprising a rigid frame, a bracket secured to said vehicle body and provided with an arm extending outwardly therefrom, means flexibly connecting the lower part of said sash with said arm, adapted to prevent vertical movement of said sash relatively to said bracket, while permitting free lateral movement of the upper part of the sash relatively to said vehicle body, and means connecting the upper part of the sash with the foldable top.

4. The combination with a vehicle body and a foldable top or cover, a window sash comprising a rigid frame, a bracket secured to said vehicle body and provided with an arm extending outwardly therefrom, means flexibly connecting the lower part of the sash with said arm, adapted to prevent vertical movement of said sash relatively to said bracket, and means connected with the foldable top, embracing a member engaging the upper rail of the sash and permitting free endwise movement of said foldable top relatively to said sash.

5. The combination with a vehicle body and a foldable top or cover, a window sash comprising a rigid frame, means flexibly connecting the lower part of the sash with the vehicle body, adapted to prevent vertical movement of said sash relatively to said vehicle body, while permitting free lateral movement of the upper part of said sash relatively to the vehicle body, and means providing connection for the upper part of the sash with said foldable top including a member engaging the upper part of said sash and adapted to limit the lateral movement thereof.

6. The combination with a vehicle body and a foldable top or cover, of a window sash, means for flexibly and detachably connecting the lower margin of the sash with the vehicle body, embracing locking means adapted to hold the sash from vertical movement relatively to the body, and means for connecting the upper margin of the sash with the foldable top embracing a vertically movable holding member mounted on the top and engaging the said upper margin of the sash.

7. The combination with a vehicle body and a foldable top or cover, of a window sash, means for flexibly and detachably connecting the lower margin of the sash with the vehicle body, embracing locking means adapted to hold the sash from vertical movement relatively to the body, and means for connecting the upper margin of the sash with the foldable top embracing a horizontal grooved rail mounted on the top and adapted to hold the top of the sash from lateral movement relatively to the top while permitting backward and forward movement of the top relatively to the sash.

8. The combination with a vehicle body and a foldable top or cover, of a window sash, means for flexibly and detachably connecting the lower margin of the sash with the vehicle body, embracing locking means adapted to hold the sash from vertical movement relatively to the body, and means for connecting the upper margin of the sash with the foldable top embracing a horizontal grooved rail of spring metal mounted on the top and adapted to yieldingly engage the upper margin of the sash.

9. The combination with a vehicle body and a foldable top or cover, of a window sash comprising a rigid frame, a plate rigidly secured to the sash, a stem having hinged connection with said plate, a supporting member secured to the vehicle body and provided with a socket adapted to receive said stem, a locking member having rotative connection with said socket member and provided with means adapted to engage said stem for locking the same in said socket to prevent vertical movement of said sash relatively to said vehicle body, the hinged connection of said stem with said plate permitting said sash to have free lateral movement with respect to said vehicle body.

10. The combination with a vehicle body and a foldable top or cover, provided with a bow pivotally connected to the body, of a window sash having flexible and detachable connection with the body, a clamp member attached to the bow and a grooved rail adapted to embrace the upper margin of the sash and having detachable connection with said clamp member.

11. The combination with a vehicle body and a foldable top or cover, provided with a bow pivotally connected to the body, of a window sash having flexible and detachable connection with the body, a clamp-member attached to the bow, and a grooved horizontal rail, adapted to embrace the upper margin of the sash and having vertically sliding and detachable connection with said clamp member.

12. The combination with a vehicle body and a foldable top or cover, provided with a bow pivotally connected with the body, of a window sash having flexible and detachable connection with the body, a clamp member attached to the bow, a rail adapted to embrace the upper margin of the sash and having vertically sliding connection with the said clamp-member, and locking means for rigidly securing said rail in position on the clamp-member when engaged with the upper margin of the sash.

13. The combination with a vehicle body and a foldable top or cover provided with a bow which is pivoted at its lower end to the body, a window sash, means for flexibly and detachably connecting the lower margin of the sash with the vehicle body, embracing locking stems and sockets therefor, locking means for holding said stems in said sockets, and means for connecting the upper margin of the said sash with said bow, comprising a clamp-member secured to the bow, a grooved rail adapted for engagement with the upper margin of the sash, means for connecting said rail with the said clamp-member embracing a locking stem and a socket member, and means for locking said stem in said socket member.

14. The combination with a vehicle body, a window sash provided with rigid top, bottom and side rails, a plate rigidly secured to the lower rail of the sash, a locking stem pivotally connected with said plate, a socket member secured to the vehicle body and adapted to receive said stem, a rotative locking member having connection with said socket member and provided with a handle, said stem being provided with intersecting, longitudinal and transverse grooves, and said rotative locking member being provided with a lug adapted for engagement with said grooves.

15. The combination with a vehicle body and a foldable top or cover, provided with a bow which is pivoted to the body, of a plurality of window sashes, means secured to the bow of said top affording detachable and flexible connection between said bow and the upper margins of the sashes, and means affording detachable and pivotal connection between the vehicle body and the lower margins of said window sashes, adapted to hold the said sashes with their lateral margins in abutting relation.

16. The combination with a vehicle body and a foldable top or cover, provided with a bow that is pivoted to the body, of a window sash, supporting members hinged to said window sash at its lower margin, means on the body adapted to receive said supporting members, a clamp surrounding and rigidly attached to the bow, a horizontally arranged rail detachably secured to said clamp and adapted to extend along the top of the sash, said rail being provided with a downwardly facing longitudinal groove adapted to receive the upper margin of the sash, and locking means for detachably connecting said rail with said clamp.

17. The combination with a vehicle body and a foldable top or cover provided with a bow, of a window sash, a clamp permanently secured to the vertical arm of the bow, and a grooved rail removably supported upon said clamp adapted for engagement with the upper part of said sash and permitting free backward and forward movement of said foldable top relatively to said sash, said clamp comprising a plate upon the inner surface of the said bow, a lug projecting outward from said plate, a vertical stem mounted on said lug at a distance from said plate, and provided with longitudinal and transverse locking grooves, a bracket rigidly secured to said rail, said bracket being provided with a socket member having a socket adapted to receive said stem, and a locking member rotatably mounted within said socket and provided with a cylindric aperture adapted to receive the said stem and with a lug adapted to engage the locking grooves of the said stem.

18. The combination with a vehicle body and a foldable top, of a window sash, and means affording flexible and detachable connection between the lower margin of said window sash and the body, comprising members rigidly attached to the sash, stems pivoted to said members, socket members on the body adapted to receive said stems, and locking means for holding said stems in said socket members, said stems and the members to which they are pivoted being provided with stop shoulders acting to limit the swinging movement of the stems relatively to the sash.

In testimony, that I, claim the foregoing as my invention I affix my signature in the presence of two witnesses, this 16th day of September, A. D. 1912.

EDWIN A. ARMSTRONG.

Witnesses:
CHARLES H. POOLE,
EUGENE C. WANN.